United States Patent
Fouquet

(10) Patent No.: US 6,543,340 B1
(45) Date of Patent: Apr. 8, 2003

(54) FOOD PROCESSING APPLIANCE

(75) Inventor: Jacques Fouquet, Lyons (FR)

(73) Assignee: Santos SA, Vaulx-en-Velin (FR)

( * ) Notice: Subject to any disclaimer, the term of this patent is extended or adjusted under 35 U.S.C. 154(b) by 0 days.

(21) Appl. No.: 10/245,366

(22) Filed: Sep. 18, 2002

(30) Foreign Application Priority Data

Oct. 1, 2001 (FR) .............................. 01 12616

(51) Int. Cl.[7] .............................. A23N 1/00; A23N 1/02; A47J 43/046; A47J 43/07; A23L 1/00
(52) U.S. Cl. .............................. 99/511; 99/513
(58) Field of Search .................. 99/492, 495, 509–513; 366/291, 297–300, 314, 601; 241/37.5, 92, 282.1, 282.2; 494/36, 37, 43, 47, 10, 85; 426/61, 63, 49, 52, 533, 599, 640, 231, 233

(56) References Cited

U.S. PATENT DOCUMENTS

| | | | |
|---|---|---|---|
| 2,297,880 A | | 10/1942 | Fredrickson |
| 2,840,130 A | | 6/1958 | Schwarz |
| 3,533,563 A | * | 10/1970 | Eriksson .................. 241/92 X |
| 3,779,522 A | * | 12/1973 | Loomans .................... 366/601 |
| 4,025,056 A | * | 5/1977 | Miles et al. ............ 366/197 X |
| 4,073,013 A | * | 2/1978 | Blach ........................ 366/601 |
| 4,506,601 A | * | 3/1985 | Ramirez et al. ............... 99/513 |
| 4,681,031 A | * | 7/1987 | Austad ........................ 99/511 |
| 4,840,119 A | * | 6/1989 | Caldi .......................... 99/512 |
| 4,924,770 A | * | 5/1990 | Raub ........................... 99/510 |
| 5,031,522 A | * | 7/1991 | Birixel et al. ................. 99/511 |
| 5,193,448 A | * | 3/1993 | Antonio ...................... 99/512 |
| 5,421,248 A | * | 6/1995 | Hsu ............................ 99/512 |
| 5,433,144 A | * | 7/1995 | Lee ............................ 99/513 |
| 5,495,795 A | * | 3/1996 | Harrison et al. ............... 99/492 |

FOREIGN PATENT DOCUMENTS

| | | |
|---|---|---|
| FR | 1233736 | 10/1960 |
| FR | 1265646 | 6/1961 |
| FR | 1290152 | 4/1962 |
| FR | 1430043 | 2/1966 |
| GB | 993852 | 11/1961 |

\* cited by examiner

Primary Examiner—Timothy F. Simone
(74) Attorney, Agent, or Firm—Dowell & Dowell, P.C.

(57) ABSTRACT

This appliance, which is for example a juicer, comprises a base, a rotating shredding tool (26), a chute (16) for introducing food items towards the tool (26), and a pusher (18), which can be received in the internal volume of the chute (16).

The chute (16) emerges substantially at the center of the tool (26), and it is provided with means (34) making it possible to prevent the rotation of the food items, when they are contact with the tool, these means (34) being placed at some distance from the travel of the pusher (18).

11 Claims, 3 Drawing Sheets

FOOD PROCESSING APPLIANCE

The present invention relates to a food processing appliance.

In the sense of the invention, such an appliance processes food items which are admitted therein, especially be grating, cutting or else peeling. It is applicable to all types of food items, whether fruit and vegetables, fish or else meat.

This processing appliance is likely to be used in hotel or catering businesses. By way of non-limiting examples, it may involve a cheese grater, a fruit grater, a cutter, a slicer or else a potato peeler.

In the case of a juicer, the latter comprises a fixed base, to which is attached, in a removable manner, a rotating basket. The latter has a bottom, forming a grater, and side walls extending from this bottom, which form a sieve.

In addition, a lid is provided, in which a chute is made, allowing fruit and vegetables to be introduced. In service, the latter are kept in contact with the grater rotating at high speed, by the action of a pusher handled by the user.

Under these conditions, the fruit or vegetables are shredded under the action of this grater. The sieve then retains the pulp formed in this way, while allowing the juice to flow.

This pulp is then removed, under the effect of the centrifugal force, towards the upper part of the basket, then recovered in a pulp reservoir. Moreover, the liquid juice having passed through the walls of the sieve is collected in a juice container.

The invention proposes producing an appliance, of the type described above, which allows a high rate of food items to be processed, while keeping a limited overall size.

The invention also aims to provide such an appliance which makes it possible for the food items which are admitted therein to be shredded satisfactorily, so as to obtain maximum yield.

Finally, the invention aims to provide such an appliance which is very simple to use and which does not require any particular attention, especially with regard to the relative positioning of its various constituent components.

To this end, the subject of the invention is a food processing appliance, especially a juicer for fruit and vegetables, comprising a base, a rotating shredding tool, especially a grater, mounted on this base, a chute for introducing food items towards the rotating tool, and a pusher which can be received in the internal volume of the chute, characterized in that the chute emerges substantially at the centre of the rotating tool, and in that means are provided making it possible to prevent the rotation of the food items, when they are in contact with the tool, these means being placed at some distance from the travel of the pusher.

The invention will be described below, with reference to the appended drawings, given solely by way of non-limiting example, in which.

Figure 1:
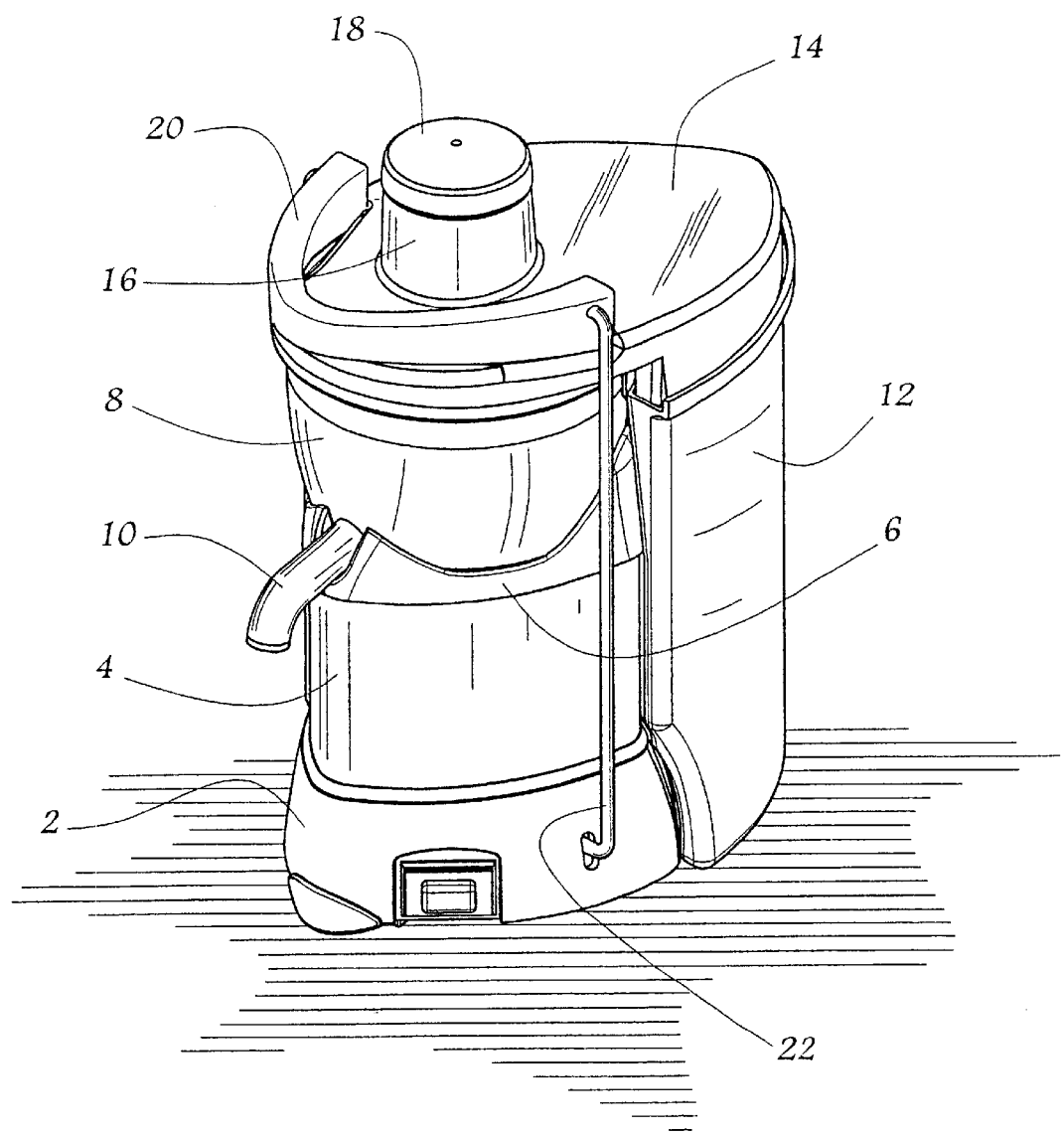
FIG. 1 is a perspective view, schematically illustrating a juicer for fruit and vegetables according to the invention.

FIG. 1 illustrates, schematically, a food processing appliance, which is a juicer for fruit and vegetables. It comprises, in a conventional manner, a base 2 which supports a column 4, on which a centring component 6 is placed, making it possible to receive a juice container 8, provided with a pouring spout 10.

In addition, a pulp reservoir 12 is provided, placed away from the pouring spout 10. This container and this reservoir are surmounted by a lid 14, in which a chute 16 for introducing fruit and vegetables is made.

A pusher 18, making it possible to keep the food items in contact with a grater, visible in the following figures, is free to slide in the chute 16. A clamping handle 20 is provided, mounted on a clamping rod 22 hinged to the base, which ensures the removable attachment of the lid 14 on the container 8 and the reservoir 12.

Figure 2:
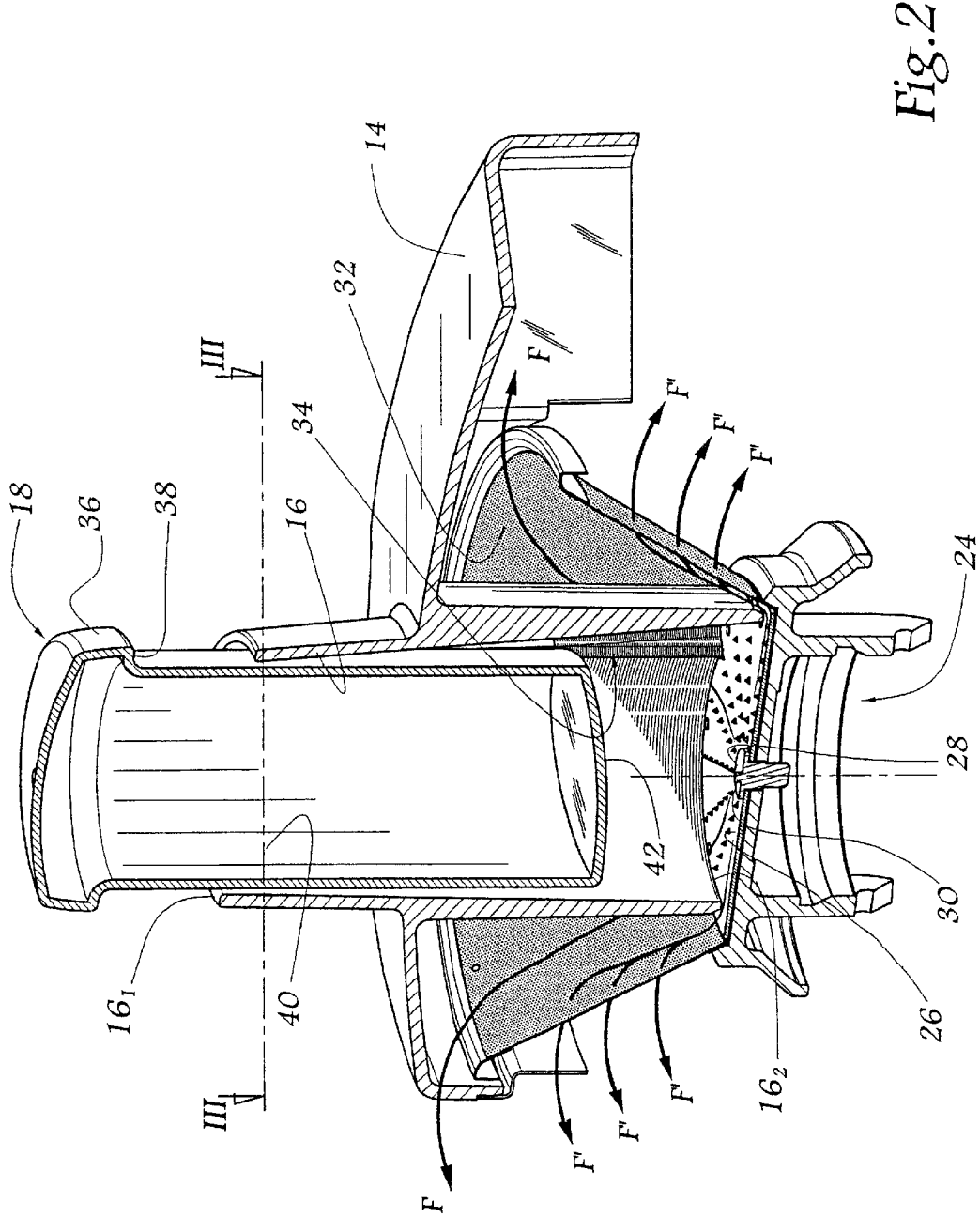
FIG. 2 is a perspective view, with cutaways, illustrating the basket, the introduction chute and the pusher belonging to the juicer of FIG. 1.

The juicer also comprises a basket, received in the internal volume of the container 8, which is especially visible in FIG. 2. This basket, denoted overall by the reference 24, has a bottom 26, the upper surface of which is provided with spikes. This bottom forms a grater, constituting a rotating shredding tool.

Furthermore, the juicer is equipped, in a known manner, with a device (not shown) making it possible to rotate this basket.

The grater 26 is provided with a circular central lug 28, on which a knife 30 is placed, projecting upwards, when the juicer rests on its base. This knife 30, which forms a disc on the lug 28, makes it possible to process that part of the fruit and vegetables located at the centre of the grater, as will be described below.

Side walls 32 of the basket, forming a sieve, extend from the bottom 26. In service, as will be specified below, the liquid juice passes through the walls of this sieve, while the latter retains the pulp.

Figure 3:
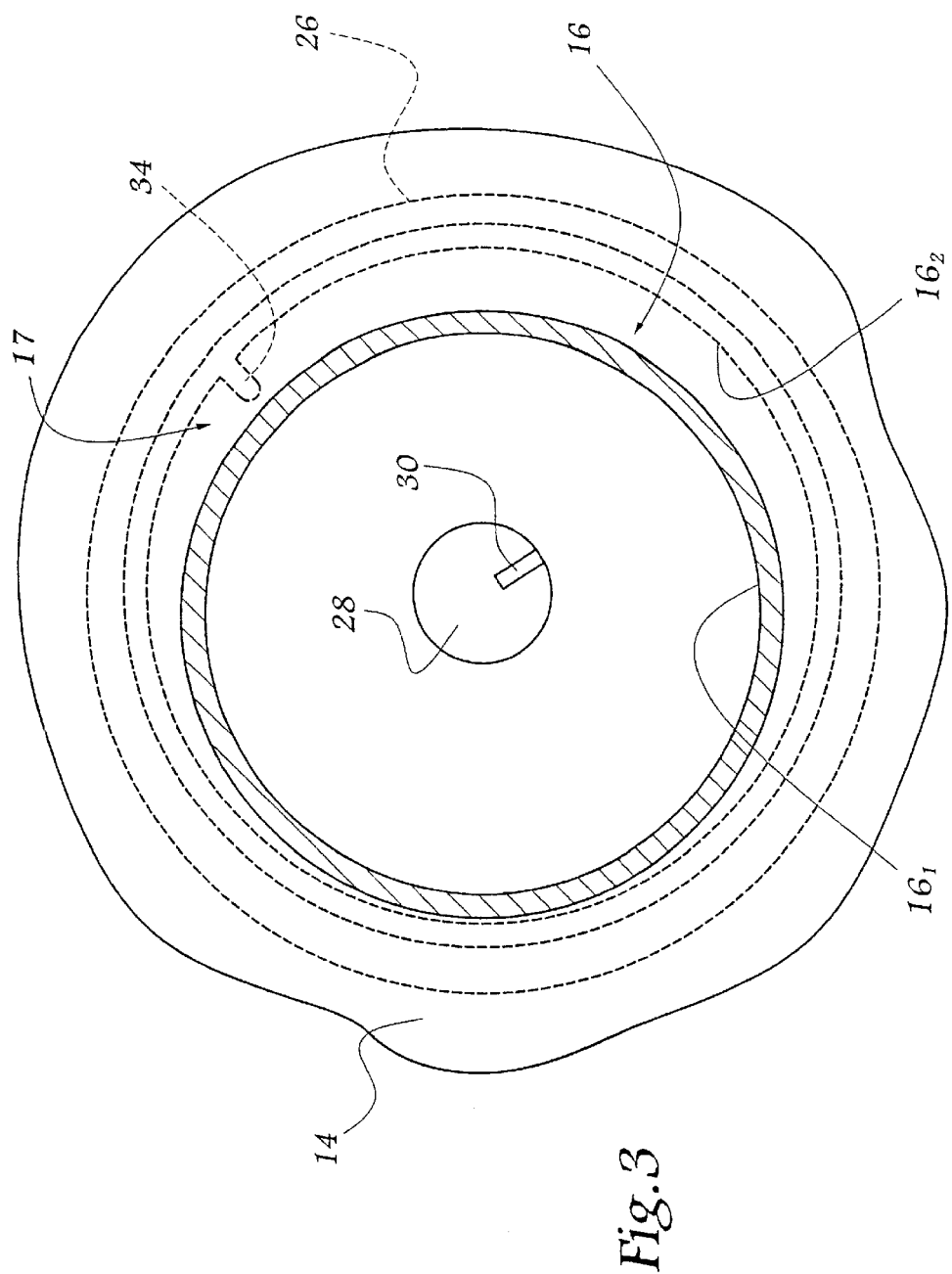
FIG. 3 is a top view, along the line III—III in FIG. 2.

With reference now to FIGS. 2 and 3, the chute 16 has a virtually frustoconical shape. More specifically, the upper end of this chute forms, seen from above, a circle $16_1$, while its lower end forms a circle $16_2$ of larger diameters.

These two circles are offset, in the sense that they do not have the same centre. However, they could be concentric, by way of a variant.

The lower circle $16_2$ is virtually concentric with the grater 26, in the sense that it may be strictly concentric with this grater, or be slightly offset with respect to the latter. As such, this chute 16 emerges, by its lower end, overall at the centre of the grater 26.

A rib 34 extends radially from the lower walls of the chute 16. This rib 34, which is present over the entire height of the chute 16, is placed in the flared region 17 of the latter, which corresponds to that part of the lower circle $16_2$ away from the centre of the upper circle $16_1$ (FIG. 3).

This rib is placed outside, that is to say at some distance from the travel of the pusher 18, whatever the angular orientation of the latter. In other words, the smallest transverse dimension of the introduction chute 16, taking account of the rib 34, is greater than the largest of the transverse dimensions of this pusher.

With more particular reference to FIG. 2, the pusher 18 has a head 36 extended, via a recessed shoulder 38, by a smooth cylindrical barrel 40. The free end 42 of the latter is bevelled, that is that it extends in an oblique manner in this FIG. 2, and in addition has a curved shape.

The operation of the juicer described with reference to FIGS. 1 to 3 will now be explained.

First of all, fruit and vegetables are introduced, via the chute 16. Given that the latter emerges substantially at the centre of the grater 26, it is capable of receiving large food items, especially whole apples, without however noticeably increasing the overall size of the juicer.

This should be compared with the prior art, in which the introduction chute, whose diameter is much smaller than that of the grater, emerges in a side region of the latter. It will be easily understood that, in the case of such a known juicer, it is necessary to provide a grater with a very large diameter, if it is desired to process large food items.

Once admitted via the chute, the fruit and vegetables fall by gravity onto the grater 26. Under these conditions, the rib 34 prevents the rotation of these food items, under the corresponding rotating action of the grater 26. In other words, this rib 34 makes it possible to block the food items, such that the spikes of the grater 26 may efficiently come into contact with them, for the purpose of shredding them.

Moreover, the user presses on the pusher 18, so as to keep the fruit and vegetables continually in contact with the grater 26. It should be noted that the bevelled shape of the end of the pusher creates a component directed outwards from the chute, which supplements the centrifugal force phenomenon.

Thus, the food items are firmly pressed, in a radially manner, on the rib 34, for the purpose of shredding them. Moreover, the design of the end of this pusher makes it possible to process the last pieces of food in contact with the grater or the knife, which guarantees maximum yield.

It is advantageous that the means making it possible to prevent the rotation of the food items be placed outside the travel of the pusher.

So, this avoids giving the pusher a shape which is indexed with respect to that of the chute, such as a groove in which the rib would be able to slide. As such, the user is able to introduce the pusher, without having to worry about its angular orientation.

This thus affords considerable comfort and appreciable speed in the use of the juicer of the invention, which are particularly noticeable in professional use, which involves very frequent handling by the user.

Finally, the presence of the central knife 30 ensures satisfactory grating of that part of the food items located at the centre of the grater. This makes it possible to overcome the absence of movement of this grater near its centre.

The pulp thus formed is retained, in a conventional manner, by the walls of the sieve 32, and is removed from the upper part of the latter, towards the reservoir 12 (arrows F). On the other hand, the liquid juice passes through the walls of the sieve (arrows F'), so as to be collected in the juice container 8.

The invention is not limited to the examples described and shown.

Thus, the food processing appliance, according to the invention, may be different from a juicer. In this respect, reference may be made to the definition given at the start of the present description.

As such, the chute is able to have shapes different from those illustrated in FIGS. 2 and 3. Thus, it is possible that its upper and lower ends are not circular, or else that they form two concentric circles, which may or may not have different diameters.

Moreover, the function designed to prevent the rotation of the food items may be provided by a structure other than a rib. Thus, provision may be made for the lower end of the chute to have a suitable shape, for the purpose of fulfilling this function. In the same vein, the chute is especially polygonal, or else elliptical.

I claim:

1. Food processing appliance, especially a juicer for fruit and vegetables, comprising a base (2), a rotating shredding tool, especially a grater (26), attached to this base, a chute (16) for introducing food items towards the rotating tool, and a pusher (18) which can be received in the internal volume of the chute (16), characterized in that the chute (16) emerges substantially at the center of the rotating tool (26), and in that means (34) are provided making it possible to prevent the rotation of the food items, when they are in contact with the tool, these means (34) being placed at some distance from the travel of the pusher (18).

2. Food processing appliance according to claim 1, characterized in that the lower part ($16_2$) of the chute has transverse dimensions close to those of the rotating tool (26).

3. Food processing appliance according to claim 1, characterized in that the lower end ($16_2$) of the chute has transverse dimensions which are larger than those of the upper part ($16_1$) of this chute, and in that the means (34) making it possible to prevent the rotation are placed in a flared region (17) of this chute (16).

4. Food processing appliance according to claim 3, characterized in that the upper part of the chute (16) has a circular shape ($16_1$), while the lower part of this chute has a circular shape ($16_2$) of larger diameter, these circular upper and lower parts not being concentric.

5. Food processing appliance according to claim 1, characterized in that the rotating tool (26) and the lower part ($16_2$) of the chute are virtually concentric.

6. Food processing appliance according to claim 1, characterized in that the means making it possible to prevent the rotation of the food items comprise a rib (34), extending from the inner walls of the chute (16).

7. Food processing appliance according to claim 1, characterized in that the means making it possible to prevent the rotation of the food items are defined by the geometry of the chute, which in particular has a polygonal or elliptic cross section.

8. Food processing appliance according to claim 1, characterized in that the free end (42) of the pusher (18) is bevelled.

9. Food processing appliance according to claim 8, characterized in that this free end (42) is curved.

10. Food processing appliance according to claim 1, characterized in that the pusher (18) has a smooth barrel (40), free to slide in the internal volume of the chute (16).

11. Food processing appliance according to claim 1, characterized in that the rotating tool (26) is provided a central knife (30), the radial dimensions of which are markedly less than those of this rotating tool.

* * * * *